(12) United States Patent
Finnerty et al.

(10) Patent No.: US 8,435,683 B2
(45) Date of Patent: May 7, 2013

(54) INTERNAL REFORMING SOLID OXIDE FUEL CELLS

(75) Inventors: Caine Finnerty, Buffalo, NY (US); Jun Cai, Midland, MI (US)

(73) Assignee: CP SOFC IP, LLC, Ann Arbor, MI (US)

( * ) Notice: Subject to any disclaimer, the term of this patent is extended or adjusted under 35 U.S.C. 154(b) by 1022 days.

(21) Appl. No.: 11/880,105

(22) Filed: Jul. 19, 2007

(65) Prior Publication Data
US 2009/0023050 A1    Jan. 22, 2009

(51) Int. Cl.
*H01M 8/22* (2006.01)
(52) U.S. Cl.
USPC ............ 429/405; 429/423; 429/495; 429/523
(58) Field of Classification Search .................. 429/405, 429/423, 495, 523
See application file for complete search history.

(56) References Cited

U.S. PATENT DOCUMENTS

| | | | |
|---|---|---|---|
| 5,733,675 A | 3/1998 | Dederer et al. | |
| 6,485,852 B1 | 11/2002 | Miller et al. | |
| 6,569,553 B1 | 5/2003 | Koripella et al. | |
| 6,699,609 B2 | 3/2004 | Kotani et al. | |
| 6,793,698 B1 | 9/2004 | Sanger et al. | |
| 7,014,942 B2 | 3/2006 | Gorte et al. | |
| 2003/0077504 A1* | 4/2003 | Hara et al. | 429/44 |
| 2004/0058228 A1 | 3/2004 | Shibata et al. | |
| 2005/0153178 A1* | 7/2005 | Ahmed et al. | 429/20 |
| 2005/0170234 A1* | 8/2005 | Liu et al. | 429/38 |
| 2006/0172885 A1* | 8/2006 | Shimazu et al. | 502/304 |
| 2006/0172886 A1* | 8/2006 | Shimazu et al. | 502/325 |
| 2006/0246337 A1* | 11/2006 | Sarkar et al. | 429/34 |
| 2006/0275647 A1* | 12/2006 | Finnerty et al. | 429/40 |
| 2007/0172416 A1* | 7/2007 | Kawashima et al. | 423/648.1 |

FOREIGN PATENT DOCUMENTS

| | | |
|---|---|---|
| EP | 1 306 920 | 5/2003 |
| EP | 1 801 905 | 6/2007 |
| WO | WO97/18597 | 5/1997 |
| WO | 2003/069705 | 8/2003 |
| WO | WO2006/097663 | 9/2006 |

OTHER PUBLICATIONS

Rabe, S., et al., Low Temperature Catalytic Partial Oxidation of Hydrocarbons on Ru- and Rh-based Catalysts, Paul Scherrer Institut.
Pukrushpan, et al., Control of Natural Gas Catalytic Partial Oxidation for Hydrogen Generation in Fuel Cell Application, Mar. 26, 2003, pp. 1-24, IEEE Transaction on Control System Technology, vol. XX.
Mattos, L.V., et al., Hydrogen production for fuel cell applications by ethanol partial oxidation on Pt/$CeO_2$ catalysts: the effect of the reaction conditions and reaction mechanism, 2005, pp. 453-463, Journal of Catalysis 233.

* cited by examiner

*Primary Examiner* — Zachary Best
(74) *Attorney, Agent, or Firm* — Burns & Levinson LLP

(57) ABSTRACT

The present teachings relate to solid oxide fuel cells with internal reforming capability. The solid oxide fuel cell generally includes a cathode, an electrolyte, an anode, and a catalyst layer in contact with the anode. The catalyst layer can include a support membrane and a reforming catalyst layer associated with the support membrane. In some embodiments, the reforming catalyst can include one or more partial oxidation reforming catalysts. The present teachings also provide methods of making and operating the solid oxide fuel cells described above.

20 Claims, 11 Drawing Sheets

INTERNAL REFORMING SOLID OXIDE FUEL CELLS

BACKGROUND

Solid oxide fuel cells (SOFCs) are energy conversion devices that are capable of efficiently converting chemical fuels directly to electrical power. They typically consist of a three-layer electrochemical cell, including a cathode, an electrolyte, and an anode. Oxygen molecules are catalytically reduced to oxide ions at the cathode, and the ions diffuse through the electrolyte to reach the anode. At the anode, a fuel (e.g., hydrogen or a syngas) reacts with the oxide ions, releasing electrons. Because the electrolyte is non-conducting, the electrons are forced to return to the cathode through an external circuit, where the derived energy is put to work.

A typical anode is a porous nickel cermet with yttria-stabilized zirconia (YSZ), in which nickel functions as both a catalyst for fuel oxidation and a conductor of electrons to the external circuitry. Fuel cells powered by the oxidation of hydrogen or hydrocarbon fuels rely on thermal H—H or C—H bond activation at the anode, and as a result, they typically operate at temperatures between about 700° C. and about 1,000° C. A common problem when using hydrocarbon fuels is the propensity of nickel-based anodes to suffer carbon deposition (or "coking") due to pyrolysis of the fuel at the hot catalyst surface. The resulting carbon deposits form a barrier layer on the anode, preventing reaction of nickel with the fuel and reducing the conductivity of the anode. In fuel cells where the anode serves as the structural support of the cell, coking can also compromise the mechanical integrity of the fuel cell. Under unfavorable conditions, SOFC anodes can be deactivated by coking in as little as several hours. For this reason, most commercially-available SOFCs are designed to operate with hydrogen as the fuel.

Hydrocarbon fuels such as natural gas, propane, gasoline, kerosene and diesel are less expensive, more easily and safely stored, and more readily available than hydrogen. Synthetic methanol and plant-derived ethanol are also under consideration as fuels. However, the problem of coking often prevents the use of these fuels in most currently available SOFCs. A possible solution is to include a reformer device as a component of the fuel cell which can convert a hydrocarbon fuel into a mixture of carbon monoxide and hydrogen (i.e., a syngas) by catalytically reacting the hydrocarbon fuel with oxygen (partial oxidation reforming) or water (steam reforming).

Steam reforming produces carbon monoxide and hydrogen by catalysis of the following reaction:

$$C_nH_m + nH_2O \rightarrow nCO + (m/2+n)H_2$$

The process is highly endothermic, and consumes a considerable amount of energy which is typically supplied by external combustion or in situ partial oxidation (autothermal reforming) of the fuel.

In partial oxidation (POX) reforming, the fuel is partially oxidized with $O_2$ over a catalyst to produce carbon monoxide and hydrogen. The reaction is exothermic, but at the cost of a lower yield of hydrogen:

$$C_nH_m + (n/2)O_2 \rightarrow nCO + (m/2)H_2$$

Autothermal reforming is a process in which both steam reforming and partial oxidation reforming reactions occur simultaneously. The energy released by the exothermic partial oxidation reaction drives the endothermic steam reforming reaction.

Because carbon monoxide can poison many reforming catalysts, the gas streams produced by any of the above reforming reactions usually are also subjected to a water gas shift reaction to convert the carbon monoxide into carbon dioxide:

$$CO + H_2O \rightarrow CO_2 + H_2$$

Any residual carbon monoxide (typically 1-2%) can be removed with a gas-separation membrane, and the hydrogen is then used to fuel the SOFC.

There have been several efforts to design "integrated" fuel reformer/fuel cell systems, some of which capture the waste heat and/or water generated by the fuel cell to drive endothermic fuel reforming reactions. However, even the most closely-associated fuel reformer/fuel cell pairings remain separate devices under the cover of a single module. The inclusion of reformer units and gas separation devices increases the cost and complexity of a fuel cell, and imposes additional downtime and maintenance costs. The added weight of the fuel reforming hardware is a further disadvantage in portable applications, such as power supplies for electric or hybrid vehicles, wilderness and battlefield electronics, and aircraft. Furthermore, although fuel reformers can function smoothly and efficiently under steady-state conditions, they are difficult to operate in an environment of intermittent and variable energy demand.

Fuel cells that can directly oxidize pure methanol have been developed, but at present, they are costly and relatively inefficient, competitive only with equally costly rechargeable lithium-ion batteries. Accordingly, there remains a need for fuel cells that can operate directly on unreformed hydrocarbon fuels without suffering from anode degradation due to coking.

SUMMARY

In light of the foregoing, the present teachings provide internal reforming solid oxide fuel cells that can address various deficiencies and shortcomings of the state-of-the-art including those outlined above. More specifically, the present teachings relate to solid oxide fuel cells with an integrated reforming catalyst layer.

In one aspect, the present teachings relate to a solid oxide fuel cell that includes a cathode, an electrolyte, an anode, and a catalyst layer in contact with the anode. The catalyst layer generally includes a support membrane and a reforming catalyst that is associated with the support membrane. The reforming catalyst can include one or more metals selected from Pt, Ni, W, Ru, Au, Pd, Mo, Cu, Sn, Rh, V, and the like. In some embodiments, the reforming catalyst can be a partial oxidation reforming catalyst. For example, platinum and palladium can be used as the partial oxidation reforming catalyst. In certain embodiments, the reforming catalyst also can include a steam reforming catalyst. For example, Ru can be used as the steam reforming catalyst. In various embodiments, the reforming catalyst can be impregnated in the support membrane.

The support membrane can be a porous ceramic. In some embodiments, the support membrane can be prepared from one or more metal oxides. For example, the one or more metal oxides can be selected from aluminum oxide (alumina), zirconium oxide (zirconia), titanium oxide, lanthanum oxide (lanthana), lanthanum strontium oxide, cerium oxide (ceria), molybdenum oxide, zinc oxide, and calcium titanium oxide. In certain embodiments, the support membrane can include one or more perovskites other than calcium titanium oxide. The support membrane can include various additives including, without limitation, one or more dispersants, plasticizers, and binders.

In some embodiments, a surface of the anode can be at least partially covered by the catalyst layer. In certain embodiments, a surface of the anode can be substantially covered by the catalyst layer, for example, so that fuel is required to pass through the catalyst layer before contacting the anode. In particular embodiments, about 80% of the surface area of the exposed surface of the anode can be covered by the catalyst layer. In some embodiments, the catalyst layer can have a thickness between about 5 μm and about 50 μm.

In particular embodiments, the present teachings provide solid oxide fuel cells integrated with a partial oxidation reforming catalyst layer supported on an anode. Such solid oxide fuel cells are capable of internally reforming hydrocarbon fuels (e.g., propane) without significant coking and/or power loss. During operation of such a solid oxide fuel cell, a hydrocarbon fuel is reformed by passage through a porous catalyst layer in the presence of oxygen. The partial oxidation reforming reaction can deplete the hydrocarbon fuel of C—C bonds, thereby reducing or preventing carbon deposition on the anode. In some embodiments, the composition of the catalyst layer can be varied to improve tolerance of other impurities (e.g., sulfur) in the hydrocarbon fuel.

Another aspect of the present teachings relates to methods of making an internal reforming solid oxide fuel cell. The methods can include depositing a support slurry onto at least a portion of an anode of a solid oxide fuel cell, drying the support slurry to form a support membrane, and associating a reforming catalyst with the support membrane.

The support slurry can include a support material dispersed in a solvent. The support material can be one or more metal oxides selected from aluminum oxide (alumina), zirconium oxide (zirconia), titanium oxide, lanthanum oxide (lanthana), lanthanum strontium oxide, cerium oxide (ceria), molybdenum oxide, zinc oxide, and calcium titanium oxide. In certain embodiments, the support material can include one or more perovskites other than calcium titanium oxide. In various embodiments, the support material can include various additives including, without limitation, one or more dispersants, plasticizers, and binders. The support material can be homogenized in an aqueous or organic solvent or mixtures thereof. In some embodiments, the support slurry can be deposited by slip-coating, dip-coating, or spin-coating. In certain embodiments, the solid oxide fuel cell can be calcined at a temperature between about 800° C. and about 1200° C. to form the support membrane. In some embodiments, the methods described above can include depositing a catalyst composition that includes a partial oxidation reforming catalyst (e.g., a salt of a metal catalyst) in a solvent onto the support membrane and calcining the solid oxide fuel cell at a temperature between about 800° C. and about 1200° C. to associate the support membrane with the partial oxidation reforming catalyst. In certain embodiments, the partial oxidation reforming catalyst can include at least one of Pt, Ni, W, Ru, Au, Pd, Mo, Cu, Sn, Rh, and V.

The foregoing as well as other features and advantages of the present teachings, will be more fully understood from the following figures, description, and claims.

BRIEF DESCRIPTION OF THE FIGURES

It should be understood that the drawings described below are for illustration purposes only and are not necessarily to scale. The drawings are not intended to limit the scope of the present teachings in any way.

FIG. 2a shows a zirconia and alumina-based support membrane. FIG. 2b shows a perovskite-based (lanthanum strontium chromite) support membrane.

DETAILED DESCRIPTION

Figure 1:
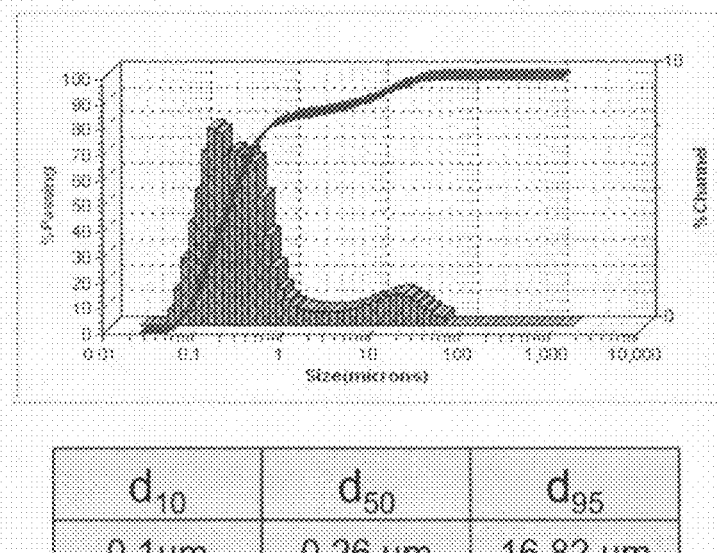
FIG. 1 shows the particle size distribution of an embodiment of a support slurry according to the present teachings.

The present teachings relate to internal reforming fuel cells and methods of making and operating the same. More specifically, the fuel cells of the present teachings include an integrated reforming catalyst layer which allows the fuel cells to internally reform various hydrocarbon fuels without an external reforming device. The catalyst layer also can protect the anode from inactivation due to coking. While the scope of the present teachings encompasses different types of fuel cells including, but not limited to, a solid oxide fuel cell, a proton exchange membrane fuel cell, a phosphoric acid fuel cell, an alkaline fuel cell, and a molten carbonate fuel cell, for brevity, only the solid oxide fuel cell embodiment will be discussed in detail below.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. Percentages provided herein generally refer to percentages by weight unless specifically stated otherwise.

It should be understood that the order of steps or order for performing certain actions is immaterial so long as the methods and processes of the present teachings remain operable. Moreover, two or more steps or actions may be conducted simultaneously.

As used herein, the term "about" refers to a +/−10% variation from the nominal value.

The present teachings provide fuel cells that have internal reforming capacity. The fuel cells of the present teachings can offer various advantages and favorable properties including, but not limited to, a low start-up temperature, resistance to coking, and resistance to power degradation, which together can lead to improved device performance and an extended useful life. In addition, the fuel cells disclosed herein can operate at a broad range of temperatures and at various electrical loads. Furthermore, the improvements provided by the present teachings can be implemented into established fuel cell fabrication processes with minimum additional costs.

In one aspect, the present teachings relate to a solid oxide fuel cell that includes a cathode, an electrolyte, an anode, and a catalyst layer in contact with the anode. In other words, the catalyst layer is an integral part of the solid oxide fuel cell, which obviates the need of an external reforming catalyst or device. In some embodiments, the solid oxide fuel cell can be a planar fuel cell, where the anode, the electrolyte, and the cathode are individual layers that can be immediately adjacent to and formed upon each other in the order listed. The catalyst layer can be immediately adjacent to and formed on exposed surfaces (i.e., the surface that is not in contact with the electrolyte) of the anode. However, it should be understood that the present teachings can be applied to solid oxide fuel cells of other geometries (e.g., tubular or monolith).

The catalyst layer generally includes a support membrane and a reforming catalyst that is associated with the support membrane. In various embodiments, the reforming catalyst can be impregnated in the support membrane. The composition and the porosity of the support membrane as well as the composition of the reforming catalyst can be tailored to meet the demands of in situ reforming under different fuel conditions.

The reforming catalyst can include one or more active metals selected from Pt, Ni, W, Ru, Au, Pd, Mo, Cu, Sn, Rh, and V, as well as other metal catalysts known in the art that can be used for fuel reforming. In some embodiments, the reforming catalyst can be a partial oxidation reforming catalyst. In certain embodiments, Pd and Pt can be used as the partial oxidation reforming catalyst. In particular embodiments, Pd and Pt in a weight ratio of about 1:10 (e.g., 1:9 to 1:11) can be impregnated into the support membrane to achieve a total metal loading of up to about 5% of the catalyst layer and about 0.1% of the solid oxide fuel cell after calcination. In some embodiments, the reforming catalyst can include a steam reforming catalyst. In certain embodiments, the reforming catalyst can include both partial oxidation reforming catalyst(s) and steam reforming catalyst(s) (e.g., Ru and/or Rh). In particular embodiments, the reforming catalyst can include Ru and Pt in a weight ratio of about 0.5 to about 1.0. To further improve the catalytic performance of the reforming catalyst, one or more promoters can be added. The promoters can be, without limitation, Li, Mg, and Ce.

The support membrane is generally porous and has a high surface area. High porosity and surface area allow fuel and air to diffuse through the membrane without significant resistance and ensure high catalytic performance by providing sufficient accessible surface for catalyst impregnation. In addition, the support membrane of the present teachings typically have adequate mechanical strength and thermal expansion properties to withstand the temperature change experienced during the internal reforming reaction.

In some embodiments, the support membrane can be a porous ceramic prepared from one or more metal oxides. For example, the support membrane can include one or more metal oxides selected from aluminum oxide (alumina), zirconium oxide (zirconia), titanium oxide, lanthanum oxide (lanthana), lanthanum strontium oxide, cerium oxide (ceria), molybdenum oxide, zinc oxide, and calcium titanium oxide. In certain embodiments, the support membrane can include one or more perovskites other than calcium titanium oxide. As used herein, a "perovskite" has the general formula $ABO_3$, wherein A and B are cations of different sizes. Examples of perovskites include, but are not limited to, lanthanum strontium chromite, lanthanum calcium chromite, and combinations thereof such as ceria-zirconia.

The metal oxides listed above can have various functions in addition to forming a layer that can provide mechanical support. For example, active metal oxides such as perovskites, ceria, zirconia, and molybdenum oxide can promote the catalytic performance of the reforming catalyst. In particular, metal oxides such as ceria and zirconia can act as oxygen storage materials and therefore, can be especially beneficial for promoting partial oxidation reforming. Ceria and some other metal oxides also can help to reduce carbon deposition on the catalyst. In various embodiments, alumina can be included in the catalyst layer to modify the support membrane due to its chemical inertness. Besides alumina and catalyst promoters, which can be included in a range of about 10% to about 50% of the total weight of the support membrane, some metal oxides such as lanthana can be used in the catalyst layer to improve the thermal stability of other metal oxides included in the support membrane (e.g., alumina) and help retain the microstructure and high surface area of the support membrane. To achieve the desired stabilizing effects, such metal oxide stabilizers can be included in the range of about 10% to about 20% of the total weight of the support membrane. Other metal oxides such as zinc oxide can be included to promote sulfur tolerance (and/or tolerance against other impurities) of the catalyst layer. In addition to metal oxides, the support membrane can include various additives including, without limitation, one or more dispersants, plasticizers, and binders. Examples of these additives will be described in more detail below in connection with the fabrication process of the support membrane.

Specific embodiments of the support membrane can be optimized based on considerations such as, without limitation, promotion of high catalytic performance and matching of the thermal expansion characteristics of the other layers in the solid oxide fuel cells. In some embodiments, zirconia and ceria can be included along with alumina in a ratio of about 0.1 to about 0.9, for example, in a ratio of about 0.1 to about 0.5. In certain embodiments, the support membrane can include by weight about 10% ceria or zirconia, about 15% lanthana, and about 70% high surface area alumina (e.g., alumina having a surface area of about 120 $m^2$ to about 140 $m^2$ per gram). In other embodiments, the support membrane can include predominantly submicron-sized doped lanthanum chromite perovskites.

In some embodiments, a surface of the anode can be at least partially covered by the catalyst layer. In certain embodiments, a surface of the anode can be substantially covered by the catalyst layer, for example, so that fuel is required to pass through the catalyst layer before contacting the anode. In particular embodiments, about 80% of the surface area of one of the anode surfaces can be covered by the catalyst layer. In some embodiments, the catalyst layer can have a thickness between about 5 µm and about 50 µm.

In some embodiments, the present teachings provide a four-layer solid oxide fuel cell with internal reforming capability. The four-layer solid oxide fuel cell, in addition to an anode support, an electrolyte layer, and a cathode layer, can include a porous partial oxidation reforming catalyst layer in contact with the anode support. The catalyst layer can include a porous catalyst support membrane impregnated with one or more partial oxidation reforming catalysts. The porous catalyst support membrane can be made of one or more metal oxides. In some embodiments, the catalyst layer can be adapted to reform propane in the presence of oxygen (i.e., by partial oxidation reforming). In certain embodiments, the catalyst layer can be further adapted to minimize carbon deposition on the anode support even when operated in the absence of water (i.e., in the absence of any water gas shift reaction). In some embodiments, the anode support can include a porous nickel cermet with yttria-stabilized zirconia (YSZ), while the catalyst layer can include platinum and palladium catalysts impregnated in a support membrane including zirconia, ceria, and alumina.

Another aspect of the present teachings relates to the fabrication of internal reforming solid oxide fuel cells. More specifically, the fabrication procedures according to the present teachings can be applied to currently available solid oxide fuel cells including, but not limited to, three-layer solid oxide fuel cells having a cermet anode (e.g., an anode made of a porous nickel cermet with doped zirconia), a perovskite-based cathode (e.g., a cathode made of a mixture of lanthanum strontium manganate and doped zirconia), and a ceramic or cermet electrolyte (e.g., an electrolyte layer made of doped zirconia). In particular, because the catalyst layer according to the present teachings can be fabricated onto the anode as the last step of the manufacturing process, the present teachings can be easily integrated into established fuel cell fabrication processes without incurring significant additional costs.

The catalyst layer disclosed herein can be formed upon an anode using various coating techniques and catalyst impregnation methods. More specifically, the support membrane of a catalyst layer can be fabricated by first preparing a support slurry that includes a support material in a solvent, then depositing the support slurry onto at least a portion of a surface of an anode of a solid oxide fuel cell to form the support membrane. The type of the support material used can be based on the various considerations described above in connection with the composition of the support membrane in general. For example, the support slurry can include one or more of the various metal oxides (including perovskites) described above. Typically, the one or more metal oxides are provided in powder form and are dispersed into water and/or one or more organic solvents. In some embodiments, the metal oxide powder (e.g., a mixture of zirconia or ceria powder and alumina powder) can be dispersed with dispersants in an organic solvent (e.g. ethanol) to form a substantially homogeneous catalyst support suspension. During this dispersion stage, the metal oxide powder(s) and the dispersant(s) can be milled for several hours, e.g., for about 8 hours to 16 hours. Additives including binders, plasticizers, and/or various chemicals such as drying process control agents then can be added into the suspension to form a stable support slurry. Subsequently, this support slurry can be subjected to a homogenization process (e.g., milling) for about 8 hours to 16 hours. The resulting homogenized support slurry can be stable for two or more months.

The support slurry can be prepared in a way such that its composition is optimized in terms of particle size distribution and viscosity to provide a crack-free and porous support membrane. Optimization can be achieved, in part, by varying the type and amount of support material used (i.e., the solid loading percentage), the solvent choice, the type and amount of additives used, as well as the speed and the length of time at and for which the dispersion and the homogenization processes are carried out. In some embodiments, the total solid loading of the support slurry (i.e., the amount of metal oxides in the solvent) can be in the range of about 10% to about 50%. For example, the total solid loading of the support slurry can be in the range of about 20% to about 25%. The exact solid loading percentage can be optimized based on the desired viscosity of the membrane slurry and the desired thickness of the support membrane.

As used herein, the term "solvent" refers to one or more liquids (including combinations thereof) that provide a suitable medium for dispersing particles of the support material and does not significantly interfere with the drying process. The properties of the solvent can affect the support membrane fabrication process in a number of ways such as by affecting the viscosity of the support slurry and the resulting stability of the support membrane, the time and temperature of the drying process, and the microstructure of the finished product.

Accordingly, the solvent choice can be the result of a balance between different considerations including, but not limited to, viscosity, drying rate, environmental concerns, safety, and economy. Examples of suitable solvents include, without limitation, water, methanol, ethanol, isopropanol, 2-butanol, 2-butanone, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether, ethylene dichloride, cyclohexanone, cyclopentanone, 2-heptanone, gamma-butyrolactone, methyl ethyl ketone, toluene, ethyl acetate, methyl lactate, ethyl lactate, methyl methoxypropionate, ethyl ethoxypropionate, methyl pyruvate, ethyl pyruvate, propyl pyruvate, N,N-dimethylformamide, dimethyl sulfoxide, N-methylpyrrolidone, tetrahydrofuran, and the like, as well as combinations thereof.

As described above, the support slurry can include a number of additives such as a dispersant, a plasticizer, and a binder, for example, to formulate a homogenous, well-dispersed, and stable coating composition. Dispersants are used to assist the breaking of large agglomerates to small particles in the milling process. Plasticizers and binders help to promote the fabrication of a strong support membrane with a certain degree of flexibility. Dispersants, plasticizers, and binders suitable for use according to the present teachings can be of natural, synthetic, or semi-synthetic origin as are known in the art. Examples of dispersants, plasticizers, and binders include, without limitation, DOLAPIX™ PC33 (ammonium polyacrylate, Zschimmer & Schwartz, Lahnstein Germany), Solsperse™ 27000 (β-napthol ethoxylate, Noveon Inc., Cleveland Ohio), sodium dodecyl sulfate (SDS), Triton X-100, Triton X-114, Tergital™ NP-7 (nonylphenol ethoxylate, Dow Chemical, Midland Mich.), CHAPS, NP-40, Tween 20, polyvinylpyrrolidone, polyethylene glycol, dibutyl phthalate, and polyvinyl butyral. The amount of a dispersant, a plasticizer, and/or a binder added into the membrane slurry can each range from about 0.3 wt. % to about 0.6 wt. % of the membrane slurry.

The support slurry can be applied to the anode of a solid oxide fuel cell to achieve a substantially uniform coating. Various coating techniques including, without limitation, spin-coating, dip-coating, and slip-coating can be used. While the thickness of each individual coating can be mainly dependent on the solid loading and the viscosity of the support slurry, the thickness of the support membrane can be increased by varying the coating speed as well as coating the anode surface multiple times. As described above, the support membrane can have a typical thickness of about 5 μm to about 50 μm, for example, between about 10 μm and about 30 μm.

After the coating step, the solid oxide fuel cell coated with the support slurry can be allowed to air dry at room temperature for about 3 hours to about 5 hours, then fired (calcined) in a furnace at high temperatures to obtain the desired support membrane microstructure. While the microstructure of the support membrane is dependent on the composition and particle size of the support material as well as the type and amount of additives used, the calcination temperature also can play an important role. For example, the calcination temperature can be controlled to be within a range of about 800° C. to about 1200° C. to provide the support membrane with optimal porosity and also sufficient mechanical strength. Optimization of the calcination temperature should consider the sintering ability and chemical properties of a particular support membrane. For example, for support membranes containing alumina and ceria or zirconia, the calcination temperature can be between about 950° C. to about 1050° C.

After the desired microstructure is obtained, one or more reforming catalysts can be impregnated onto or into the support membrane. For example, one or more of the active metals (e.g., Pt, Ni, W, Ru, Au, Pd, Mo, Cu, Sn, Rh, and V) described above can be provided in the form of a soluble salt (e.g., as nitrates or chlorides) and dissolved in a solvent such as water or ethanol. The amount of active metal(s) in the impregnation solution can be varied within a range of about 0.1% to about 10%. For example, when Pt and Pd catalysts are used for partial oxidation reforming of propane, a mixture of Pd and Pt salts in ethanol or water with a ratio of about 0.05 to about 0.5 can be used. In some embodiments, the metal catalysts can be impregnated onto or into the support membrane to achieve a total metal loading of up to about 5% of the support membrane (about 0.1% of the solid oxide fuel cell) after calcination. To add steam reforming catalysts, one or more steam reforming catalysts such as Ru can be added into an impregnation solution containing one or more partial oxidation catalysts or separately impregnated onto or into the catalyst support. For example, both Ru and Pt can be impregnated into a support membrane, e.g., at a Ru:Pt ratio in the range of about 0.5 to about 1.0. Soluble salts of promoters such as Li, Mg, Ce, and the like also can be added to improve the catalytic performance of the reforming catalysts. Since the catalyst loading is only about 0.1% of the weight of the entire solid oxide fuel cell, the additional cost for the catalyst membrane tends to be a small fraction of the total cell fabrication cost. The additional cost of implementing the improvements of the present teachings (i.e., the additional cost incurred by the catalyst layer) into a three-layer solid oxide fuel cell is estimated to be about 10 cents/W.

After the reforming catalyst has been impregnated onto or into the support membrane, the fuel cell can be dried and subsequently calcined at high temperatures to decompose the one or more catalyst salts and form the active metal oxide catalysts. The calcination temperature usually is controlled within a range of about 600° C. to about 1000° C. to achieve the desired particle size and thermal stability. In embodiments where Pd and Pt are used as the reforming catalyst, the calcination temperature can be about 800° C. to about 900° C. The solid oxide fuel cell loaded with the reforming catalyst can be reduced in hydrogen at about 600° C. to about 800° C. before use.

An internal reforming solid oxide fuel cell according to the present teachings generally operates as follows. A mixture of fuel and air is introduced to the anode (i.e., via the catalyst layer) of the solid oxide fuel cell. The composition of the fuel/air mixture can be controlled to provide an optimal oxygen/carbon ratio for partial oxidation reforming. For example, for the partial oxidation reforming of propane, the oxygen/carbon ratio can be maintained in a range of about 0.5 to about 0.65. In certain embodiments, the oxygen/carbon ratio can be maintained at about 0.58. Meanwhile, air is introduced to the cathode and the solid oxide fuel cell can be heated to an operating temperature in a range between about 700° C. and about 850° C. (e.g., at an operating temperature of about 800° C.). As the fuel/air mixture diffuses through the catalyst layer, hydrogen is generated in situ and oxidized on the anode surface, which releases and conducts electrons to the external load.

In some embodiments, the internal reforming solid oxide fuel cells of the present teachings can begin to consume air and a hydrocarbon fuel (e.g., propane) at about 200° C., and begin internally to reform the hydrocarbon fuel at about 250° C. Compared to solid oxide fuel cells without a catalyst layer of the present teachings, a start-up temperature drop of as much as about 200° C. can be realized. In various embodiments, the solid oxide fuel cells of the present teachings can start generating power at an operating temperature of about 400° C. For embodiments that include one or more steam reforming catalysts, steam reforming can take place at about 650° C., after partial oxidation has begun and water produced thereby has been made available. The present solid oxide fuel cells can operate directly on propane in a wide range of temperatures with high power densities. For example, the solid oxide fuel cells of the present teachings can produce a power density of about 1.0 W/cm² at an operating temperature of about 800° C. In certain embodiments, the solid oxide fuel cells of the present teachings can operate at about 700° C., at about 750° C., and at about 850° C., to produce a power density of about 0.5 W/cm², about 0.8 W/cm², or about 1.1 W/cm², respectively. While various embodiments of the solid oxide fuel cells of the present teachings can operate within a broad range of electrical loads, fuel utilization can be more efficient at higher loads. The solid oxide fuel cells of the present teachings also can operate solely on hydrocarbon fuels for extended periods of time, for example, over 1000 hours, with negligible carbon deposition and/or with little power degradation (e.g., with a power loss of less than about 5%).

The internal reforming catalyst layer of the present solid oxide fuel cells can be fabricated easily, for example, by using standard slurry coating and catalyst impregnation methods. As described above, the catalyst layer can be made from a wide selection of catalysts and support membranes, which permits optimization for reforming a variety of hydrocarbon fuels. In various embodiments, the solid oxide fuel cells of the present teachings can operate in the absence of water or steam.

Aspects of the present teachings can be further understood in light of the following examples, which should not be construed as limiting the scope of the present teachings in any way.

EXAMPLES

The performance of certain embodiments of the internal reforming solid oxide fuel cells (SOFCs) of the present teachings was studied under different operating conditions. Also, certain material and fabrication parameters were varied and their effect on device performance was investigated.

Except as otherwise specified, the embodiments of the SOFCs tested included a cathode made of a mixture of porous lanthanum strontium manganate and doped zirconia, an electrolyte composed of a thin and dense layer of doped zirconia, an anode made of a porous nickel and doped zirconia cermet, and a catalyst layer with Pd and Pt catalysts impregnated in a support membrane mainly comprising alumina, ceria, and zirconia.

A. Composition of Support Slurry

FIG. 1 shows the particle size distribution of an embodiment of a support slurry according to the present teachings. The particular embodiment shown had a solid loading of about 20-25% and included fine size alumina, ceria, and zirconia dispersed in ethanol. The particle size distribution was analyzed by a Microtrac Particle Size Analyzer.

As shown in FIG. 1, the support slurry had a $d_{50}$ of about 0.26 μm. Particles of the support material in the support slurry, therefore, were shown to be mainly in the sub-micron range (although a small percentage, i.e., about 10%, of the slurry composition, probably agglomerates of larger particles, was observed to have a diameter of greater than about 1 μm), and could be expected to provide the support membrane with high surface area properties.

Figure 2:
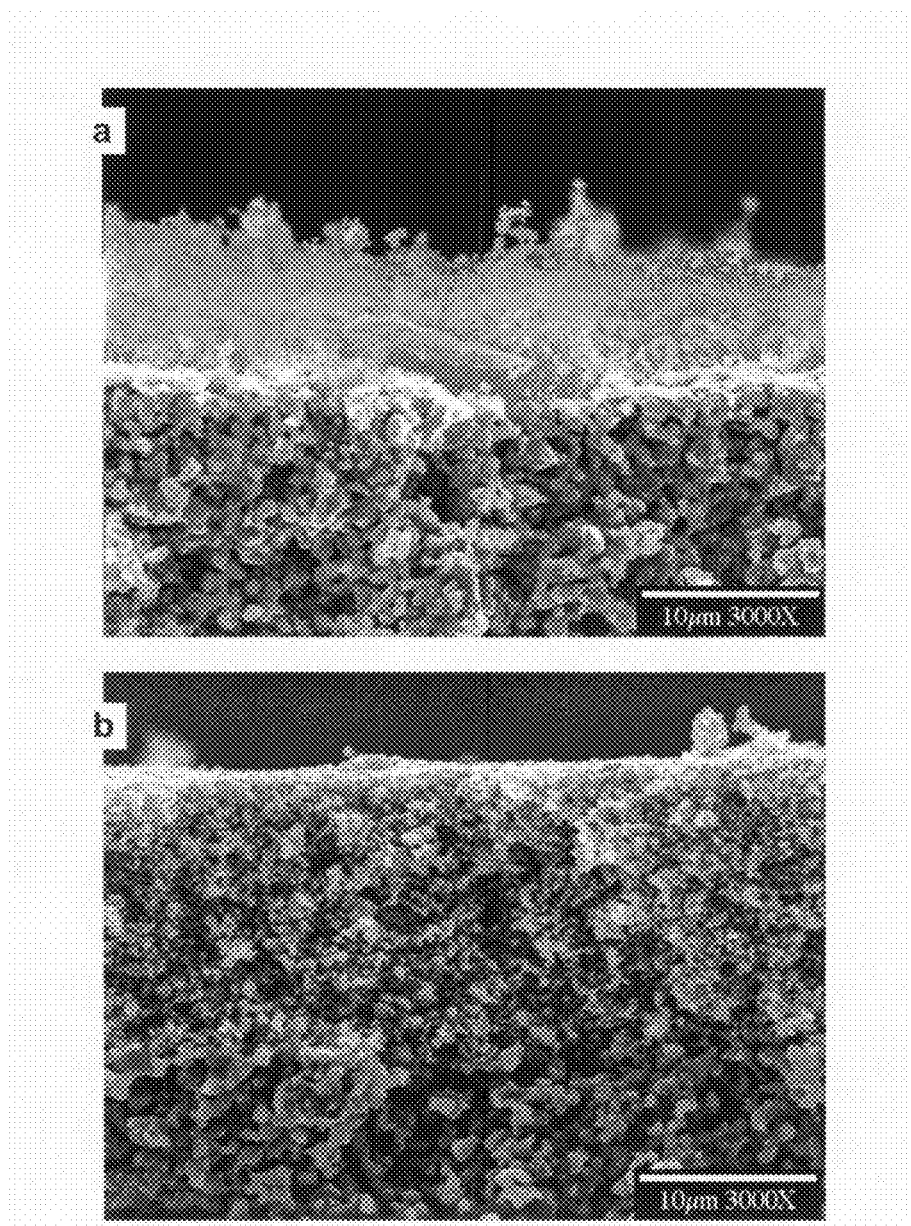
FIG. 2 shows scanning electron microscopy (SEM) images of two different embodiments of a support membrane according to the present teachings coated on a nickel and doped zirconia cermet anode.

FIG. 2 shows scanning electron microscopy (SEM) images of two embodiments of the support membrane of the present teachings fabricated on a porous anode made of a nickel-doped zirconia cermet after calcination (magnification: 3000×). The support membrane shown in FIG. 2a is a mixture of alumina and zirconia. FIG. 2b shows a perovskite-based (lanthanum strontium chromite) support membrane. The thickness of the support membrane in each case is about 10-15 μm. As can be seen from these images, the support membranes had a porous microstructure with submicron pores. Also, it can be seen that the support membranes bonded well to the anode after calcination.

Figure 3:
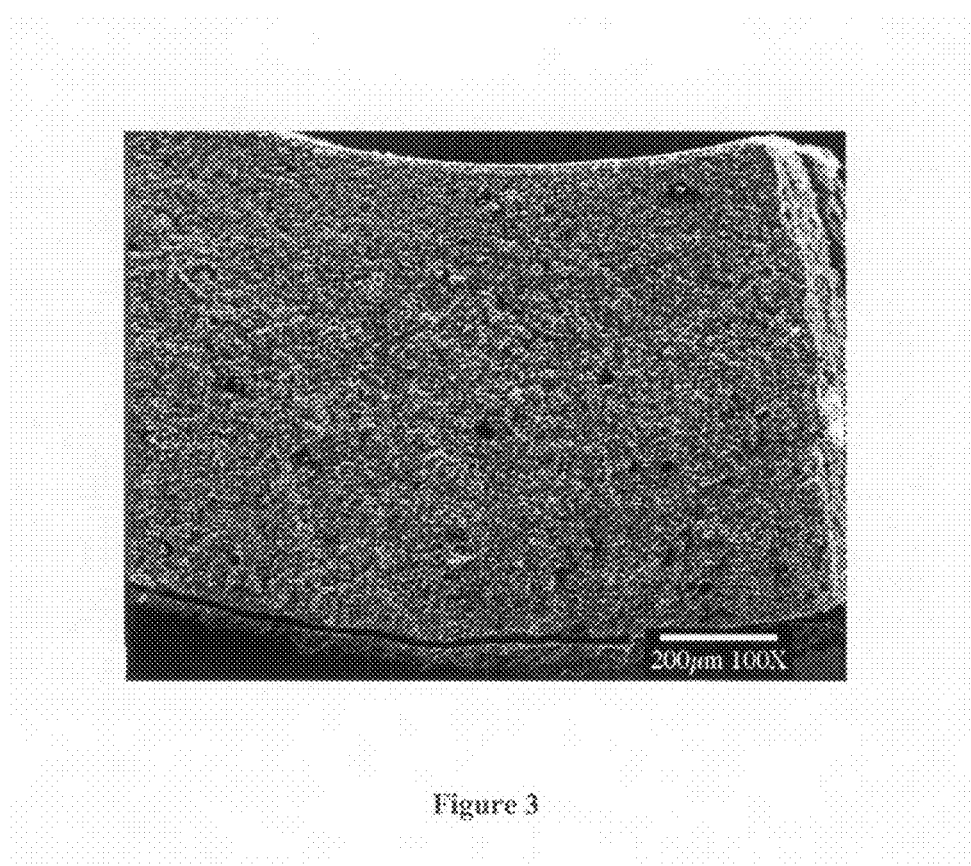
FIG. 3 is an SEM image of a solid oxide fuel cell according to the present teachings.

FIG. 3 is an SEM image of an embodiment of a four-layer internal reforming SOFC according to the present teachings (magnification: 100×). The layers are, from bottom to top, the cathode, the electrolyte, the anode, and the catalyst layer. The cathode is a porous lanthanum strontium manganate and doped zirconia mixture. The electrolyte is a dense layer of doped zirconia. The anode is a porous nickel and doped zirconia cermet. Again, it can be seen that the catalyst layer bonded well to the anode after calcination.

B. Composition of Reforming Catalyst

The performance, specifically the direct propane reforming capacity, of the SOFCs of the present teachings was compared to that of a typical three-layer SOFC as the reference SOFC. In terms of composition, the only difference between the three-layer/reference SOFC and the SOFCs of the present teachings was the absence of a catalyst layer. In each case, a mixture of propane and air was fed into the anode side of the SOFC at a constant fuel flow rate. The chemical composition of the gas feed was controlled with an oxygen/carbon ratio optimized for partial oxidation of propane. Specifically, the oxygen/carbon ratio was maintained in the range of 0.5 to 0.85, with a typical ratio of about 0.58. Air was supplied to the cathode side of the SOFCs to provide sufficient oxygen. The SOFCs were program-heated from room temperature to an operating temperature of about 800° C. at a rate of about 10° C./min. A constant load of 0.56 V was applied to each of the tested SOFCs by a DC electronic load device. The composition of the exhaust gas was monitored by mass spectroscopy and the power density of each of the tested SOFCs was measured.

Figure 4:
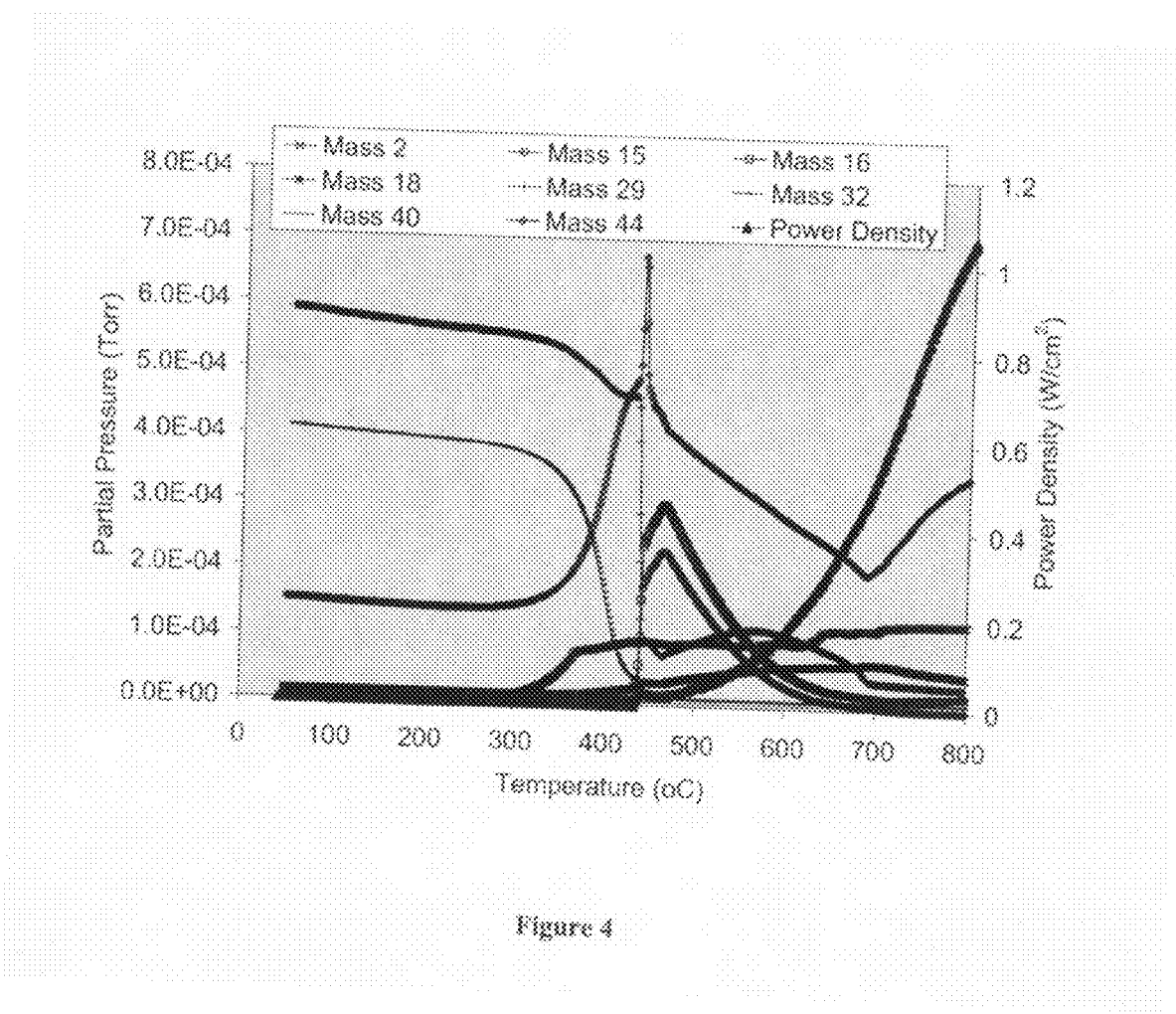
FIG. 4 identifies the various exhaust gas species and shows the power density generated by a reference three-layer SOFC (i.e., one without a catalyst layer of the present teachings) operating on propane at a constant load of about 0.56 V between room temperature and about 800° C. Mass spectroscopy was used to monitor the generation of the various exhaust gas species.

FIG. 4 shows the evolution of various exhaust gas species and the power density generated against the internal temperature of the reference SOFC (i.e., the three-layer SOFC without a catalyst layer). It can be observed in FIG. 4 that most of the propane reforming took place at around 450° C., as represented by the sharp partial pressure decrease of mass 29 (propane). The partial pressure of mass 2 (hydrogen) increased significantly at the same temperature, suggesting that hydrogen was generated in situ through propane reforming on the nickel metal surface of the anode. For mass 18 (water), its partial pressure increased dramatically above 300° C. and continued to increase to 800° C. Power was generated at about 450° C. and reached about 1.1 W/cm² when the operating temperature rose to 800° C.

Figure 5:
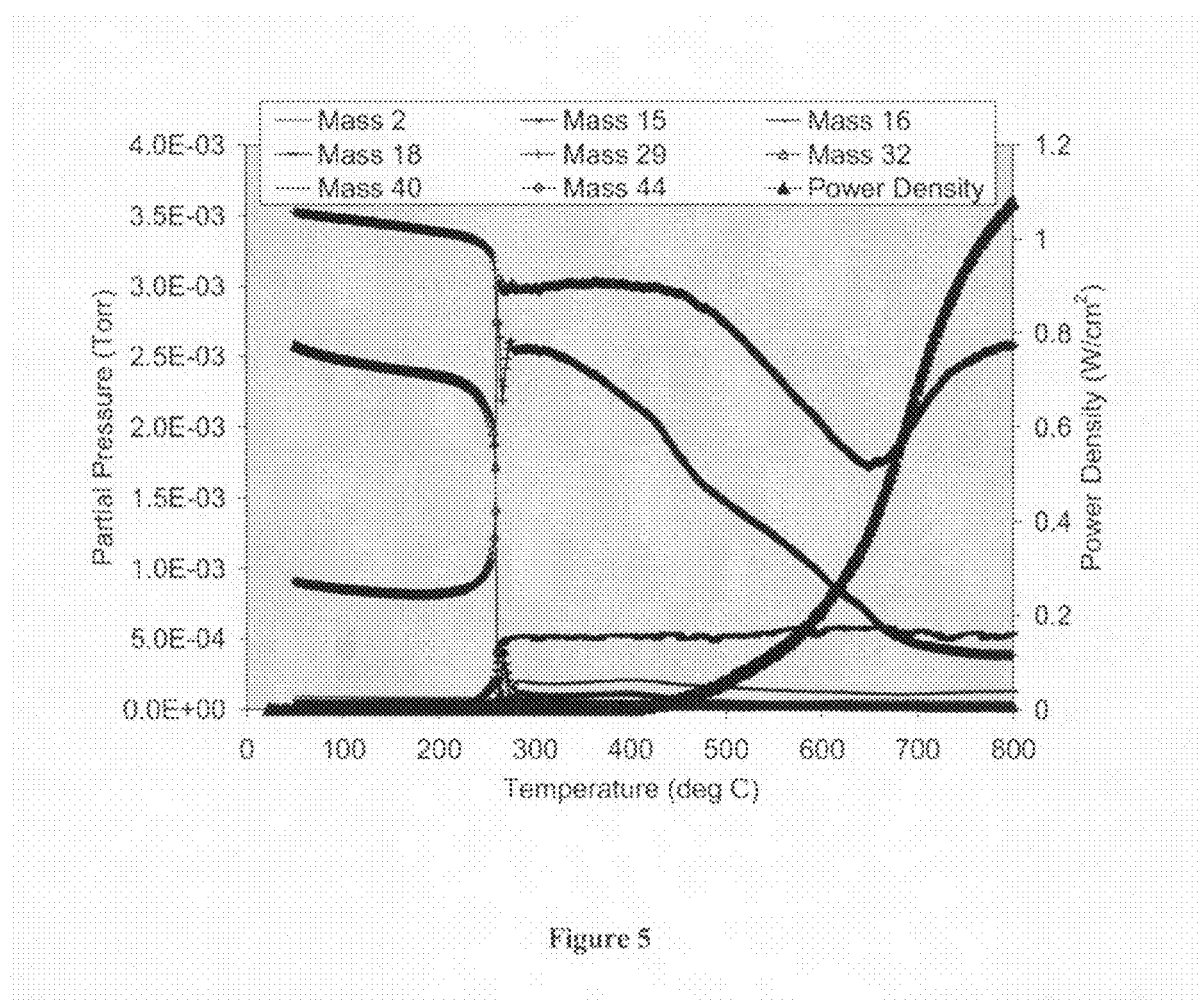
FIG. 5 identifies the various exhaust gas species and shows the power density generated by an embodiment of a four-layer SOFC (e.g., one having a Pd—Pt reforming catalyst layer) according to the present teachings operating on propane at a constant load of about 0.56 V between room temperature and about 800° C. Mass spectroscopy was used to monitor the generation of the various exhaust gas species.

FIG. 5 shows the comparison testing results obtained with an illustrative embodiment of an internal reforming SOFC (specifically one having Pd and Pt catalysts impregnated in a support membrane mainly comprising alumina, ceria, and zirconia) of the present teachings. As shown in FIG. 5, the partial pressure of mass 29 (propane) and mass 32 (oxygen) decreased and mass 2 (hydrogen) emerged dramatically at around 250° C., suggesting that partial oxidation reforming of propane started to take place at about 250° C., which is about 200° C. lower than what is required for fuel cells without a catalyst layer (see FIG. 4). The partial pressure of mass 18 (water) emerged sharply at 250° C. as a result of the oxidation of propane and increased gradually as the temperature rose to 800° C. Because the inclusion of the catalyst layer enabled fuel reforming to take place at lower temperatures and partial oxidation reforming (being an exothermic reaction) generated heat in-situ, the start-up of the solid oxide fuel cell was accelerated and power could be generated in a shorter time.

Referring again to FIG. 5, it can be seen that power was generated at around 400° C., which is about 50° C. lower than the reference three-layer SOFC (see FIG. 4). Without wishing to be bound to any particular theory, it is believed that the start-up temperature can be further reduced by optimizing the electrolyte materials. When the temperature reached about 800° C., the cell power density was about 1.1 W/cm$^2$.

When catalysts with both partial oxidation and steam reforming functions are impregnated onto the catalyst support membrane, the propane partial oxidation products can undergo further steam reforming to produce hydrogen.

Using the same basic three-layer solid oxide fuel cell described above, a different embodiment of a four-layer solid oxide fuel cell of the present teachings was tested under conditions identical to those described above. More specifically, the catalyst layer in this embodiment included Ru in addition to Pt and Pd to allow both steam reforming and partial oxidation reforming. The testing results are shown in FIG. 6.

Figure 6:
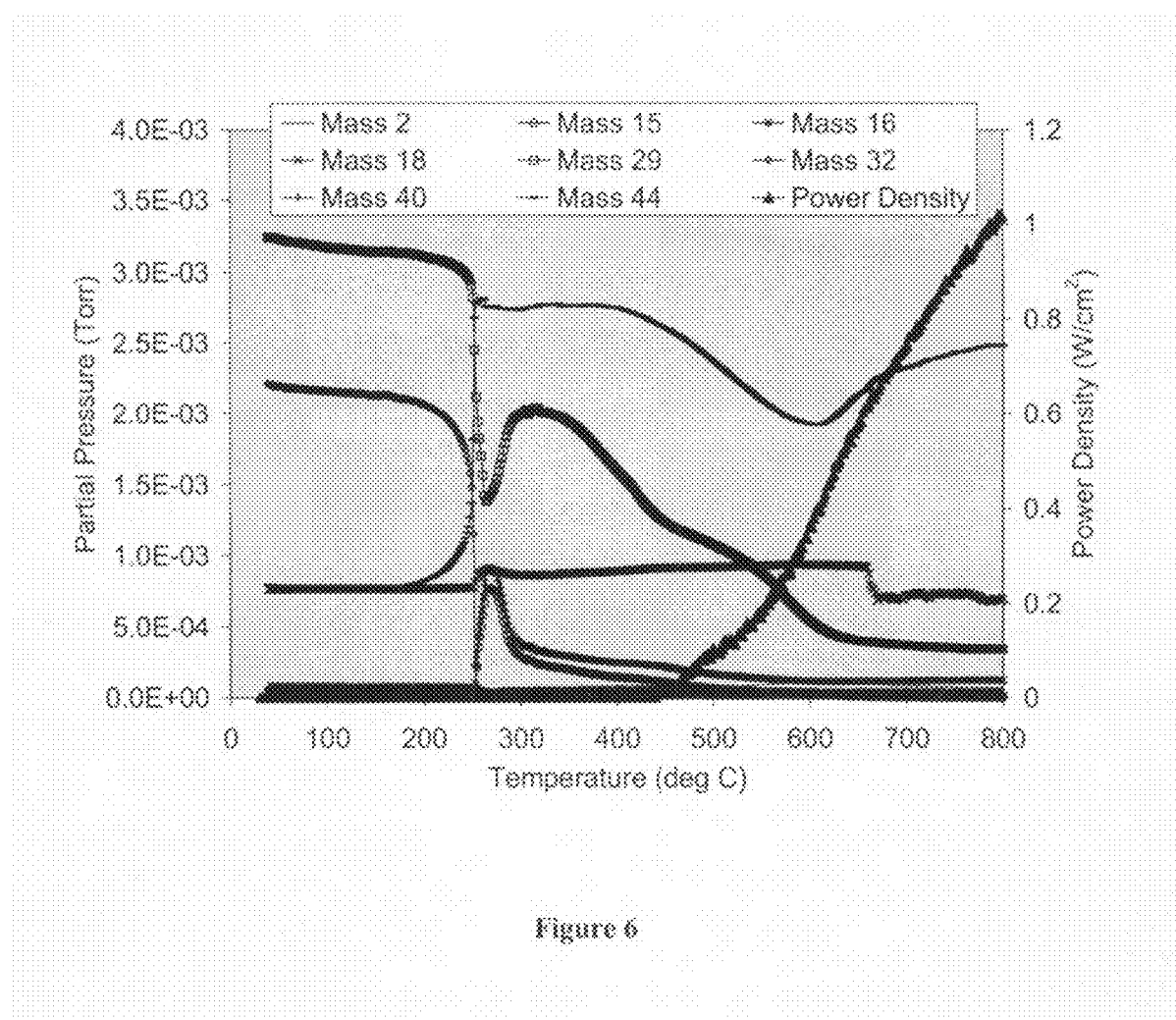
FIG. 6 identifies the various exhaust gas species and shows the power density generated by another embodiment of a four-layer SOFC (e.g., one having a Pd—Pt—Ru reforming catalyst layer) according to the present teachings operating on propane at a constant load of about 0.56 V between room temperature and about 800° C. Mass spectroscopy was used to monitor the generation of the various exhaust gas species.

As can be seen in FIG. 6, the partial oxidation of propane again took place at around 250° C., which is illustrated by the significant decrease in the partial pressures of both mass 29 (propane) and mass 32 (oxygen). The partial pressure of mass 18 (water) increased sharply at 250° C. and continued to increase until around 650° C., at which point the partial pressure of mass 18 suddenly decreased, suggesting that water was consumed. At the same time, the partial pressure of mass 28 (carbon monoxide, not shown) increased sharply, implying that a significant amount of carbon monoxide was generated at this temperature. Together, the sharp decrease of the partial pressure of water and the sharp increase of the partial pressure of carbon monoxide demonstrated that steam reforming took place at about 650° C. with the addition of Ru in the catalyst layer. The power density was observed to reach above 1 W/cm$^2$ at about 800° C.

Relating the increase in power density (1 mg/W at 800° C. for propane reforming) to the cost of the catalyst loading of the catalyst layer, the average increase in material cost translated to less than 10 cents/W, suggesting that the SOFCs of the present teachings can be well suited for mass production.

C. Effects of Operating Temperature on Device Performance

The observations that the partial oxidation of propane could begin as low as about 250° C. on the internal reforming SOFCs of the present teachings suggest that these SOFCs can perform fuel reforming in a wide range of temperatures. The performance of an embodiment of an SOFC of the present teachings operating directly on propane was investigated at various temperatures from about 700° C. to about 850° C. with loads from zero to about 1 V.

Figure 7:
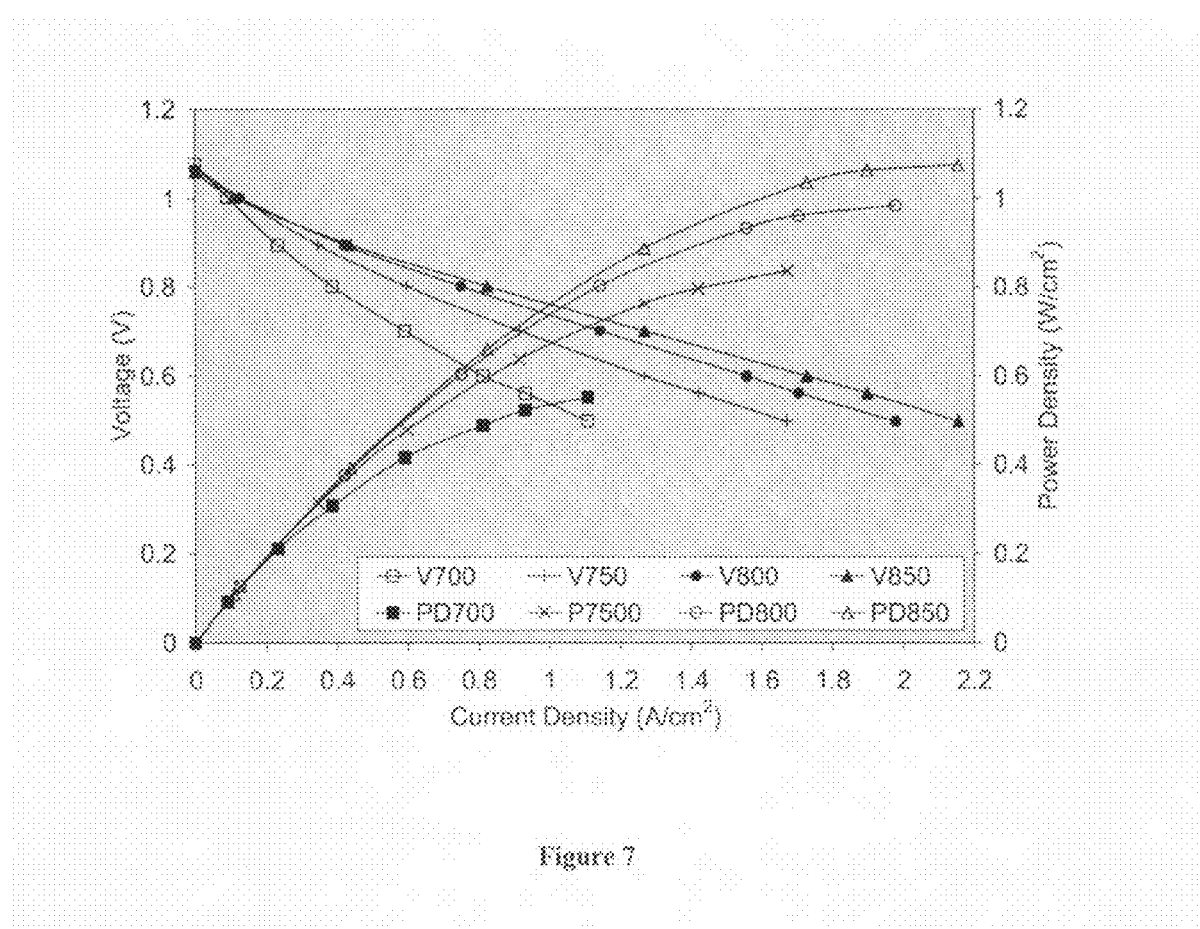
FIG. 7 compares the performance of an embodiment of a solid oxide fuel cell according to the present teachings at different operating temperatures (i.e., 700° C., 750° C., 800° C., and 850° C., respectively) in terms of voltage and power density.

FIG. 7 shows the current-voltage (I-V) curves of a four-layer internal reforming SOFC at operating temperatures of 700° C., 750° C., 800° C., and 850° C. across an electrical load of 0.56 V (applied by a DC electronic loading device). The SOFC tested had the default composition described above. As seen in FIG. 7, when the operating temperature was about 700° C., the power density of the fuel cell was about 0.5 W/cm$^2$. The cell power density increased significantly to about 0.8 W/cm$^2$ when the operating temperature was raised to about 750° C. When operated at about 800° C. and about 850° C., the cell power density reached about 1.0 W/cm$^2$ and about 1.1 W/cm$^2$, respectively. Compared to most commercial solid oxide fuel cells that have power density of less than 0.5 W/cm$^2$ when operated at intermediate or high temperatures, these data show that the SOFCs of the present teachings can operate at temperatures above 700° C. with higher power densities.

D. Effects of Load Conditions on Device Performance

Internal reforming SOFCs of the present teachings also can operate under a variety of load conditions, e.g., from a zero load to a full load. Using an embodiment having the default composition, the operation of SOFCs of the present teachings under different load conditions was investigated.

Figure 8:
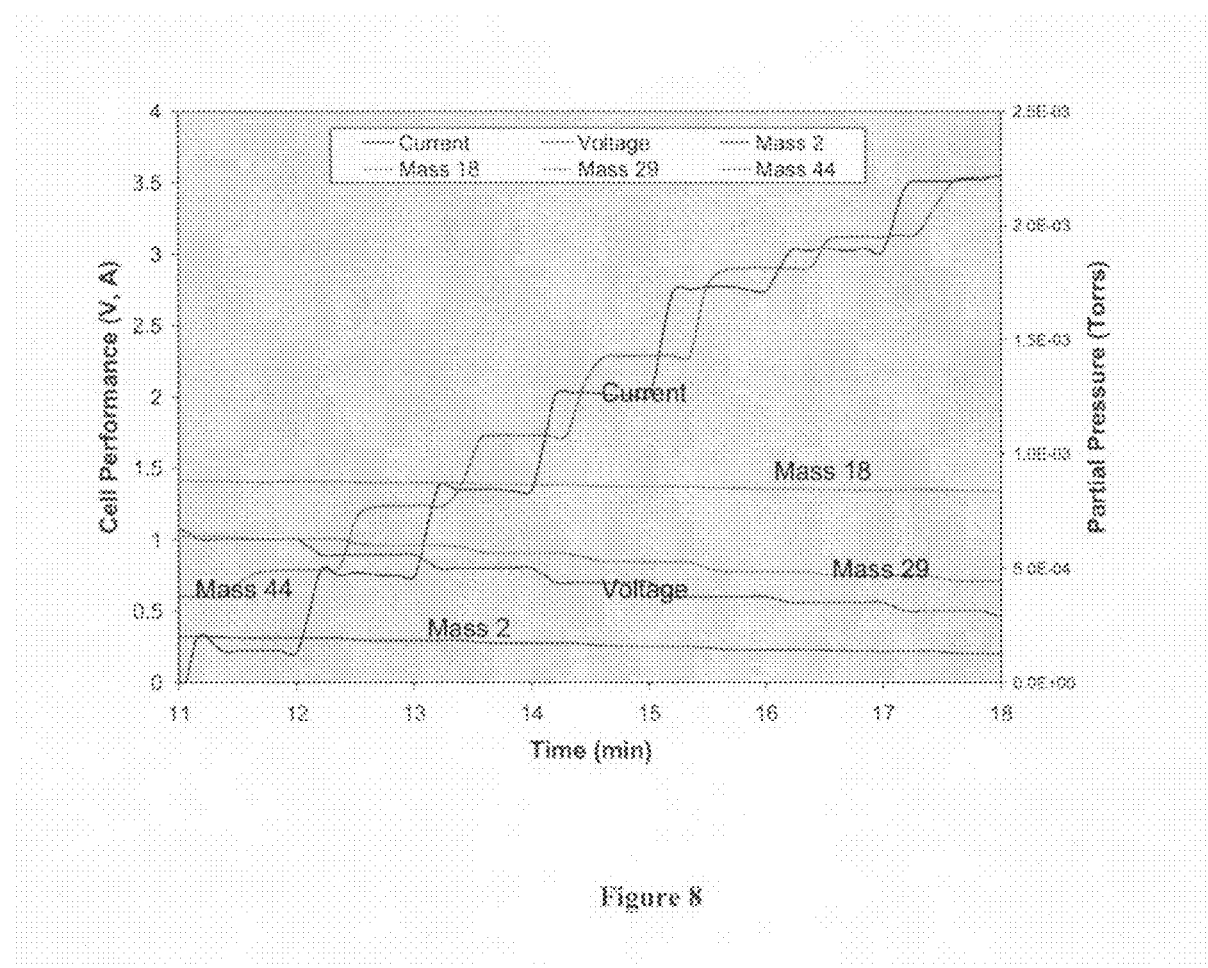
FIG. 8 shows the partial pressure of various exhaust gas species as well as the current and voltage generated by an embodiment of a four-layer SOFC (e.g., one having a Pd—Pt reforming catalyst layer) according to the present teachings operating on propane as a function of time where the load was increased stepwise over time. Mass spectroscopy was used to monitor the generation of the various exhaust gas species.

FIG. 8 shows the composition of the exhaust gas stream against different electrical loads. As shown in FIG. 8, the partial pressure of mass 44 (carbon dioxide) increased with increasing fuel cell current, while that of mass 28 (carbon monoxide, not shown) decreased. Therefore, it may be concluded that a low voltage and a high current can facilitate the oxidation of carbon monoxide to form carbon dioxide, which can help generate more power. In addition, it was observed that the partial pressure of mass 29 (propane) and mass 2 (hydrogen) decreased with increasing fuel cell current, suggesting that more propane and hydrogen were utilized when low voltages were applied. From these results, the optimal operating voltage for the embodiment tested was determined to be in the range of about 0.5 V to about 0.7 V.

E. Effects of Fuel Type on Device Performance

In further studies, the performance of the SOFCs of the present teachings was compared between using pure hydrogen and internally reforming propane. It was observed that similar power was produced regardless of whether the SOFCs of the present teachings were operated directly on hydrogen or on an equivalent amount of propane, suggesting that the internal reforming SOFCs of the present teachings can operate on either hydrogen or propane without noticeable power loss.

F. Effects of Fuel Flow Rate on Device Performance

To investigate how the fuel flow rate can affect the performance of the internal reforming SOFCs of the present teachings, the flow rate of the propane/air mixture feeding into the SOFCs was gradually changed while maintaining a fixed ratio of oxygen/carbon. In these studies, the oxygen/carbon ratio was kept constant at 0.58 while the flow rate of propane was varied from about 9 mL/min to about 4 mL/min at an interval of 1 mL/min. The embodiments of the SOFCs tested (each having the default composition described above) were operated at 800° C. and gas chromatography was used to monitor the composition of the exhaust gas.

Figure 9:
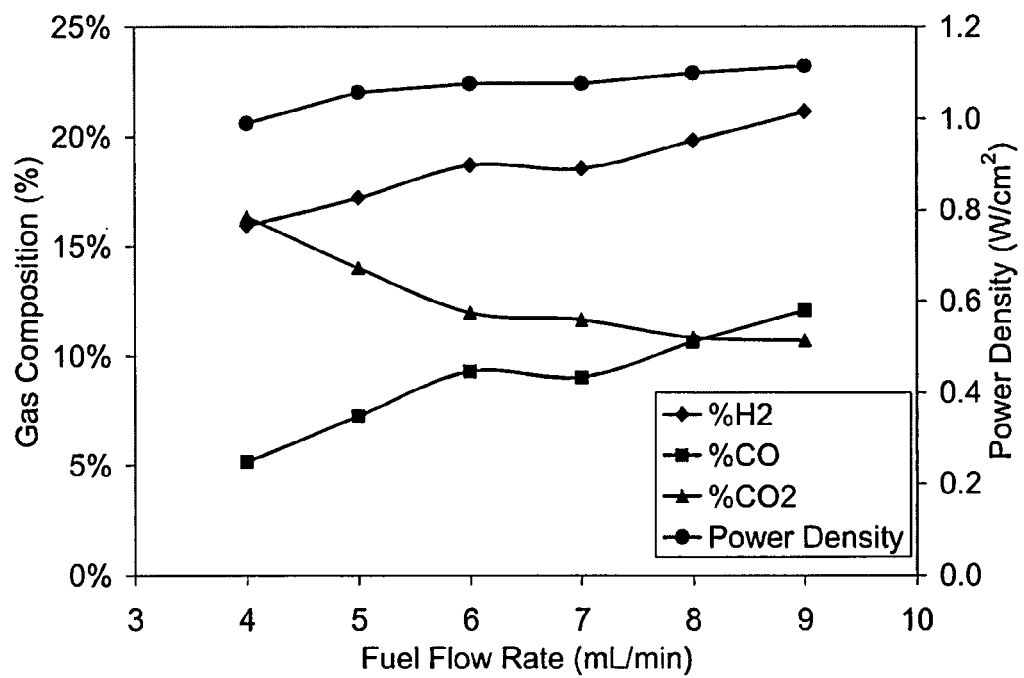
FIG. 9 shows the exhaust gas composition and the device performance of an embodiment of a four-layer SOFC according to the present teachings operated at 800° C. as a function of fuel flow rate.

FIG. 9 shows the exhaust gas composition (measured by gas chromatography) and the device performance of these SOFCs (in terms of power density). As shown in FIG. 9, at a flow rate of 9 mL/min, the exhaust gas contained about 21% of $H_2$, about 12% of CO, and about 11% of $CO_2$. No noticeable amount of propane nor other hydrocarbons was detected in the exhaust stream, suggesting that propane was reformed close to 100% in the SOFCs of the present teachings. When the fuel flow rate was gradually reduced, it was observed that the compositions of $H_2$ and CO decreased while that of $CO_2$ gradually increased. For example, at a fuel flow rate of 4 mL/min, there was about 16% $H_2$, about 5% CO, and about 16% $CO_2$ in the exhaust gas after internal reforming. In addition, it was observed that when the fuel flow rate was reduced from about 9 mL/min to about 4 mL/min, the power density was reduced by only about 11%, suggesting that a decrease in the fuel flow rate can lead to improvement in fuel utilization. These data show that the SOFCs of the present teachings can operate over a wide range of fuel flow rates without significant impact on its device performance. In other words, power systems based on the SOFCs of the present teachings can produce relatively constant power even with some fluctuations in the fuel feed.

G. Device Performance after Long-Term Internal Reforming Operation

Certain embodiments of the SOFCs of the present teachings were subject to long-term testing on propane to investigate their performance. Comparative results were obtained with reference SOFCs without a catalyst layer. The compositions of the tested SOFCs are the same as the default SOFCs and the reference SOFCs described above. The default operation conditions (a load of 0.56 V and an operating temperature of 800° C.) were used. The results are presented in FIG. 10.

Figure 10:
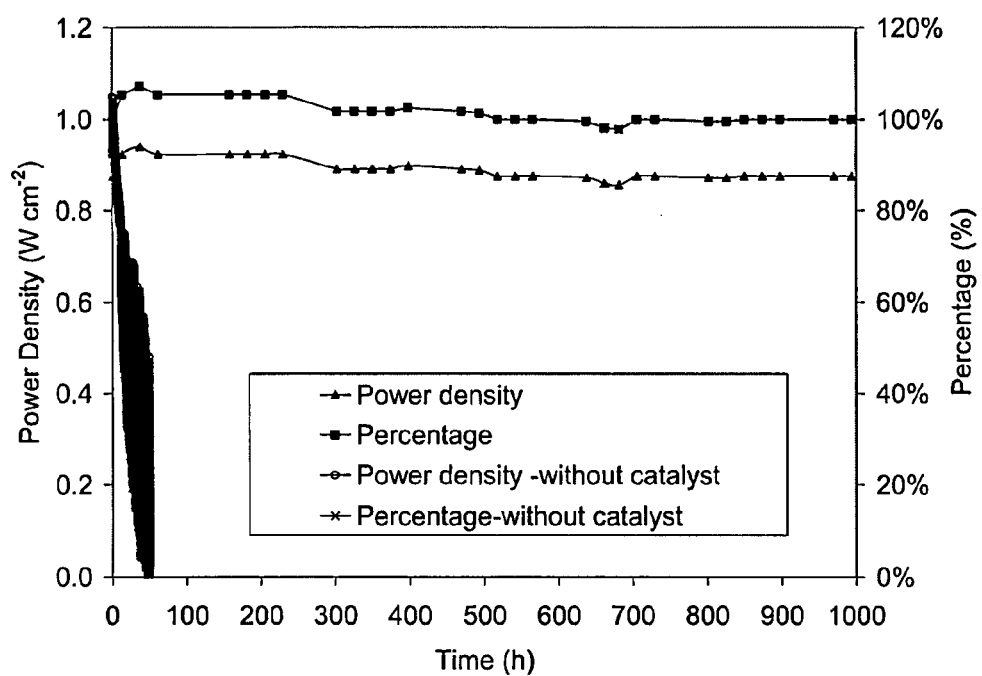
FIG. 10 compares the performance of an embodiment of a solid oxide fuel cell according to the present teachings with the performance of a reference solid oxide fuel cell without a reforming catalyst layer after long-term operation on propane.

As shown in FIG. 10, the power of the reference SOFC (i.e., without a reforming catalyst layer) quickly decreased to almost zero in about 50 hours. In comparison, the internal reforming SOFC of the present teachings, after 1000 hours of direct propane operation, showed only a power loss of about 5%. These results show that the inclusion of an integrated reforming catalyst layer of the present teachings can significantly increases the performance of a typical SOFC when it is operated on a hydrocarbon fuel such as propane.

H. Compositional Changes after Long-Term Internal Reforming Operation

The internal reforming SOFC and the reference SOFC tested above were subsequently analyzed for carbon deposition using temperature-programmed oxidation (TPO). Cell pieces were placed in a quartz tube and heated to 900° C. Oxygen gas was used in the oxidation study and helium was used as the carrier gas. The results are shown in FIG. 11.

Figure 11:
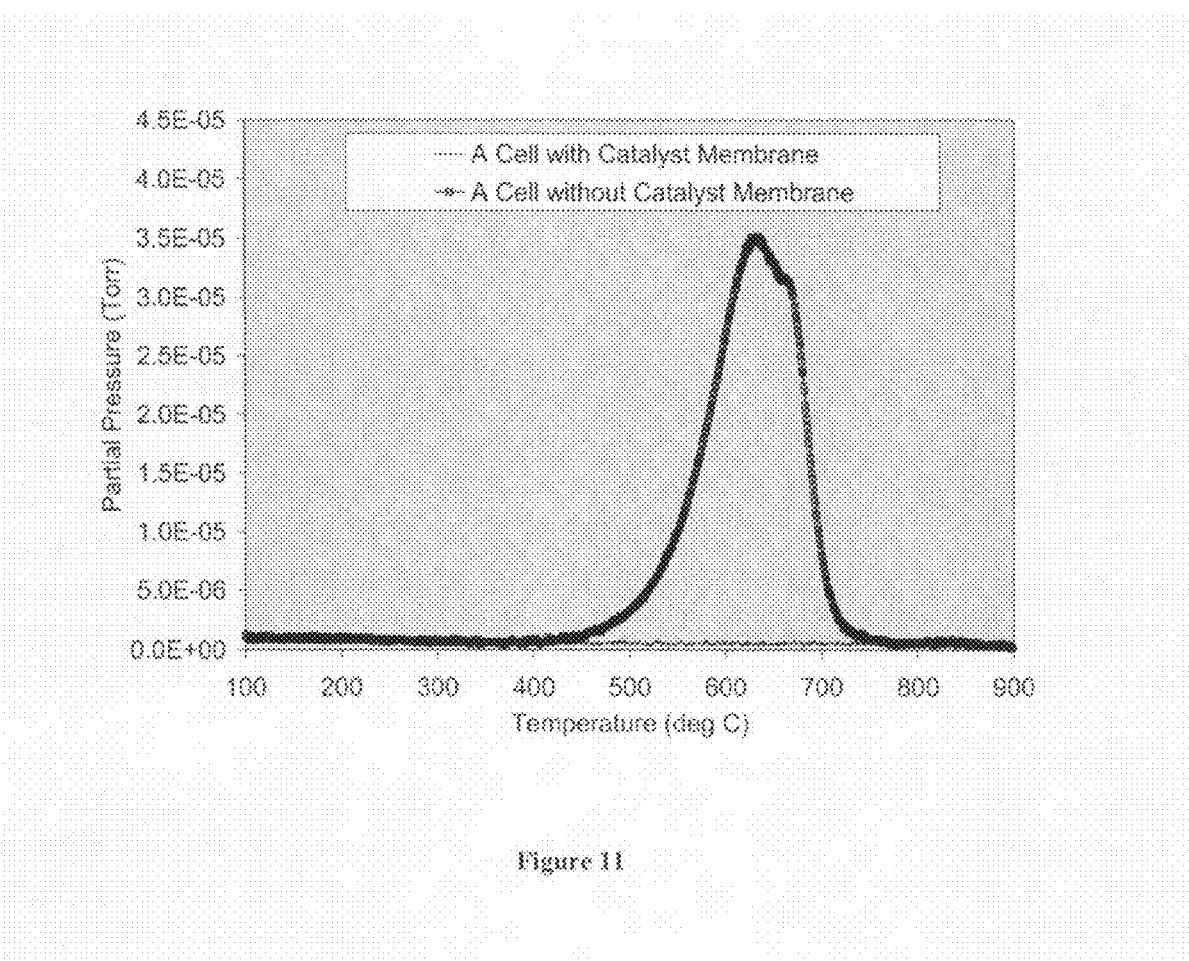
FIG. 11 compares the temperature-programmed oxidation (TPO) profiles obtained from an embodiment of a solid oxide fuel cell of the present teachings and a reference SOFC without a catalyst layer both after long-term operation on propane.

As can be seen in FIG. 11, the TPO profile obtained from cell pieces of the internal reforming SOFC shows basically no change in the partial pressure of mass 44 (carbon dioxide), suggesting that no carbon was deposited on the anode of the internal reforming SOFC during propane reforming. For the reference SOFC tested above, its TPO profile shows a significant carbon peak present at about 650° C., showing that carbonaceous substances had formed on the cell. The carbon deposits on the cell also were visible to the eye.

SEM images were obtained to investigate the effects of long-term internal reforming on the microstructure of the catalyst layer and the SOFC itself. From these images, it was observed that the morphology of the catalyst layer was retained even after 1000 hours of internal reforming on propane. In addition, back-scattering analysis using SEM revealed no evident carbon. The microstructure of the anode also showed similar porosity and particle size after 1000 hours of internal reforming, suggesting that the overlying reforming catalyst layer provided excellent protection to the anode against both local overheating and carbon deposition. It was further observed that the electrolyte remained dense without any noticeable structural changes. The cathode also retained its original microstructure and exhibited no evident particle size growth. In summary, the internal reforming SOFCs of the present teachings appear to be able to preserve its original microstructure with respect to all four cell layers as well as retaining its full functionality even after 1000 hours of propane reforming.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A fuel cell comprising:
   a cathode;
   an electrolyte;
   an anode; and
   a catalyst layer in contact with the anode, wherein the catalyst layer comprises a reforming catalyst associated with a support membrane, the support membrane comprising ceria, zirconia, lanthana, and alumina, and one or more metal oxides selected from lanthanum strontium oxide, molybdenum oxide, calcium titanium oxide, lanthanum strontium chromite, and lanthanum calcium chromite.

2. The fuel cell of claim 1, wherein the reforming catalyst comprises at least one of Pt, Ni, W, Ru, Au, Pd, Mo, Cu, Sn, Rh, and V.

3. The fuel cell of claim 1, wherein the reforming catalyst comprises at least one of Pt and Pd.

4. The fuel cell of claim 1, wherein the reforming catalyst comprises Ru.

5. The fuel cell of claim 1, wherein the support membrane further comprises one or more metal oxides selected from titanium oxide and zinc oxide.

6. The fuel cell of claim 1, wherein the anode is partially covered by the catalyst layer.

7. The fuel cell of claim 1, wherein the anode is substantially covered by the catalyst layer.

8. The fuel cell of claim 1, wherein the reforming catalyst is impregnated in the support membrane.

9. The fuel cell of claim 1, wherein the catalyst layer has a thickness between about 5μm and about 50μm.

10. The fuel cell of claim 1, wherein zirconia and ceria are included with alumina in a ratio of about 0.1 to about 0.9.

11. The fuel cell of claim 1, wherein the support membrane comprises ceria and zirconia in a range of about 10% to about 50% by weight of the total weight of the support membrane.

12. The fuel cell of claim 11, wherein the support membrane comprises lanthana in a range of about 10% to about 20% by weight of the total weight of the support membrane.

13. A fuel cell comprising:
    a cathode;
    an electrolyte;
    an anode; and
    a catalyst layer in contact with the anode, wherein the catalyst layer comprises a reforming catalyst associated with a support membrane, the support membrane comprising alumina ceria, zirconia, and one or more metal oxides selected from lanthanum strontium oxide, molybdenum oxide, calcium titanium oxide, lanthanum strontium chromite, and lanthanum calcium chromite.

14. The fuel cell of claim 13, wherein zirconia and ceria are included with alumina in a ratio of about 0.1 to about 0.9.

15. The fuel cell of claim 13, wherein the support membrane further comprises one or more metal oxide elected from titanium oxide, lanthanum oxide, and zinc oxide.

16. A method of making an internally reforming fuel cell, the method comprising:
    depositing a support slurry onto at least a portion of an anode of a fuel cell, wherein the support slurry comprises a plurality of metal oxides in a solvent, wherein the plurality of metal oxides comprise alumina, ceria and zirconia;
    drying the support slurry and calcining the fuel cell at a temperature between about 800° C. and about 1200° C. to form a support membrane; and
    associating a reforming catalyst with the support membrane.

17. The method of claim 16, wherein the support slurry farther comprises one or more metal oxides selected from titanium oxide, lanthanum oxide, lanthanum strontium oxide, molybdenum oxide, zinc oxide, calcium titanium oxide, lanthanum strontium chromite, and lanthanum calcium chromite.

18. The method of claim 16, wherein the-reforming catalyst comprises at least one of Pt, Ni, W, Ru, Au, Pd, Mo, Cu, Sn, Rh, and V.

19. The method of claim 16, wherein the support slurry is deposited by slip-coating, dip coating, or spin-coating.

20. The method of claim 16, wherein associating a reforming catalyst with the support membrane comprises depositing a catalyst composition comprising a reforming catalyst in a solvent onto the support membrane and calcining the fuel cell at a temperature between about 800° C. and about 1200° C. to associate the support membrane with the reforming catalyst.

* * * * *